(12) United States Patent
Lee et al.

(10) Patent No.: US 10,352,437 B2
(45) Date of Patent: Jul. 16, 2019

(54) PREDICTIVE TRANSMISSION CONTROL METHOD THROUGH ROAD SHAPE RECOGNITION

(71) Applicant: HYUNDAI AUTRON CO., LTD., Seongnam-si (KR)

(72) Inventors: Dae-Geun Lee, Gunpo-si (KR); Yong Min Kim, Seongnam-si (KR); Jae Hoon Byeon, Seongnam-si (KR); Ji Young Jung, Yongin-si (KR)

(73) Assignee: HYUNDAI AUTRON CO., LTD., Seoul (KR)

(*) Notice: Subject to any disclaimer, the term of this patent is extended or adjusted under 35 U.S.C. 154(b) by 115 days.

(21) Appl. No.: 15/368,140

(22) Filed: Dec. 2, 2016

(65) Prior Publication Data
US 2017/0159805 A1    Jun. 8, 2017

(30) Foreign Application Priority Data
Dec. 3, 2015    (KR) .................. 10-2015-0171661

(51) Int. Cl.
*F16H 59/66* (2006.01)
*F16H 61/02* (2006.01)
*B60W 40/072* (2012.01)

(52) U.S. Cl.
CPC ....... *F16H 61/0213* (2013.01); *B60W 40/072* (2013.01); *F16H 59/66* (2013.01); *F16H 2059/663* (2013.01); *F16H 2059/666* (2013.01); *F16H 2061/0223* (2013.01)

(58) Field of Classification Search
CPC ............... F16H 59/66; F16H 2059/663; F16H 2059/666; F16H 61/0213; F16H 2061/0223; B60W 40/072
See application file for complete search history.

(56) References Cited

U.S. PATENT DOCUMENTS 6,085,137 A * 7/2000 Aruga .................... F16H 59/66
                                                     477/120

FOREIGN PATENT DOCUMENTS

| CN | 103824461 A | 5/2014 |
|---|---|---|
| CN | 104670211 A | 6/2015 |
| JP | 8194890 A | 7/1996 |
| JP | 10-122342 A | 5/1998 |
| JP | 2005-155826 A | 6/2005 |
| KR | 10-2000-0067329 A | 11/2000 |
| KR | 10-2010-0012407 A | 2/2010 |
| KR | 10-2014-0061156 A | 5/2014 |
| KR | 10-2014-0083280 A | 7/2014 |
| KR | 10-2015-0028879 A | 3/2015 |
| KR | 10-2015-0061143 A | 6/2015 |

* cited by examiner

*Primary Examiner* — Huan Le
(74) *Attorney, Agent, or Firm* — Baker & Hostetler LLP; Hyunho Park

(57) ABSTRACT

The present invention relates to a predictive transmission control method through road shape recognition, and more particularly, to a control method for carrying out predictive transmission by recognizing the shape of a road utilizing information of a high density map. The present invention provides a transmission control method which can provide an accurate predictive transmission by recognizing the shape of the front road based on GPS information.

9 Claims, 2 Drawing Sheets

PREDICTIVE TRANSMISSION CONTROL METHOD THROUGH ROAD SHAPE RECOGNITION

CROSS-REFERENCE TO RELATED APPLICATION

The present application claims the benefit of priority from Korean Patent Application No. 10-2015-0171661 filed in the Korean Intellectual Property Office on Dec. 3, 2015, the entire contents of which are incorporated herein by reference.

BACKGROUND OF THE INVENTION

Field of the Invention

The present invention relates to a predictive transmission control method through road shape recognition, and more particularly, to a control method for carrying out predictive transmission by recognizing the shape of a road utilizing information of a high density map.

Background Art

The statements in this section merely provide background information related to the present disclosure and may not constitute prior art.

Recently, automobile manufacturers are trying to realize autonomous vehicles having an advanced driver assistance system (ADAS) with a higher level.

However, the systems depending on sensors, such as cameras and radars have some limits. That is, such sensors have lots of technical problems which are still unresolved, and the sensors increase in price when being improved in hardware performance.

Current sensor technology makes it difficult to recognize a vehicle suddenly entering at the intersection or situations in front of a driver's vehicle. Moreover, the sensor cannot secure a perfect accuracy. For instance, cameras are sensitive to weather and radars make it difficult to recognize pedestrians.

Therefore, the automobile manufacturers utilize value-added traffic information systems for realizing autonomous vehicles in order to overcome such limits, and the representative value-added traffic information systems are V2X, high density maps, and so on.

V2X is the technology to connect a vehicle with external environment and means the technology to automatically recognize driving environment and road environment and provide them for a driver while the vehicle is driving. In the autonomous vehicles, V2X serves to provide information on the sensor's dead zones. The vehicle can receive information on driving direction of another vehicle and information on traffic accidents on the road that cannot be sensed by the sensors.

The high density map is a map containing information on locations and forms of all fixed things on the road. The high density map serves to complement the sensor's performance under situations that the sensor cannot be operated normally. Vehicles can supplement the information of the sensor utilizing the information of the high density map when the information of the sensor is inaccurate due to obstacles or bad weather. Furthermore, the vehicle can predict the front road environment because the high density map contains information of height of the road, width of lanes, locations of traffic lights and so on differently from the existing navigations.

In the meantime, an automatic transmission uses the current vehicle speed value and a value of an accelerator pedal sensor (APS) received from the sensor in order to control transmission, and carries out transmission by reflecting the current vehicle status and a driver's will.

The current transmission control method makes predictive transmission control impossible because the sensor mounted on the vehicle cannot recognize the shape of the road before the vehicle enters even though there is a corner or a slope way in front of the vehicle.

SUMMARY OF THE INVENTION

Accordingly, the present invention has been made in view of the above-mentioned problems occurring in the prior art, and it is an object of the present invention to provide a transmission control method which can provide accurate predictive transmission by recognizing the shape of a road based on a GPS.

Technical objects to be achieved by the present invention are not limited to the above-described objects and other technical objects that have not been described will be evidently understood by those skilled in the art from the following description.

To accomplish the above object, according to the present invention, there is provided a road shape recognition method for predictive transmission including the steps of: collecting information of vehicle position; collecting information of road shapes necessary for the vehicle to recognize the road shape based on the vehicle position information; updating information of the road shape using the vehicle position information; and dividing a plurality of sections based on the front distance of the vehicle and expressing the level of the road shape in each section based on the road shape information.

According to an embodiment, the vehicle position information is collected through GPS information, the road shape contains gradient information of the road on which the vehicle is running and curvature information of the road, and the road shape information is collected through a high density map data DB located inside or outside the vehicle.

According to an embodiment, in the road shape collecting step or the information updating step, if there is any error in the vehicle position information or the road shape information, the vehicle position information or the road shape information is corrected using the previously stored information.

Moreover, in the road shape information collecting step, the road shape information is selected and collected based on the vehicle position information on the map data DB.

In another aspect of the present invention, the present invention provides a predictive transmission control method including the steps of: collecting road shape information of the road on which the vehicle is running; dividing a plurality of sections based on front distance of the vehicle and expressing the level of the road shape at the sections based on the road shape information; and setting a target gear of the predictive transmission based on the level of the road shape.

According to an embodiment, the road shape contains gradient information of the road and curvature information of the road. Additionally, if the level of the road shape exceeds the previously set threshold value, the target gear of the predictive transmission is set.

Furthermore, if the level of the road shape is an object for predictive transmission control, a target gear of the predictive transmission is set based on a road shape value and a front distance value corresponding to the level of the road shape.

In addition, the predictive transmission control method further includes a step of establishing a transmission plan of the predictive transmission based on the set target gear after the target gear setting step, wherein the predictive transmission is controlled according to the transmission plan.

In a further aspect of the present invention, the present invention provides a predictive transmission control device including: a position information collecting unit for collecting vehicle position information; a distance information collecting unit for collecting front distance information of the vehicle; and a road shape information generating unit which collects road shape information necessary for recognizing the shape of the front road of the vehicle based on the vehicle position information, divides the road into a plurality of sections based on the front distance information, and expresses the level of the road shape relative to the sections based on the road shape information.

As described above, according to a preferred embodiment of the present invention, the predictive transmission control method through road shape recognition can carry out accurate predictive transmission by recognizing the shape of a road utilizing the GPS and the high density map.

Furthermore, the predictive transmission control method according to the present invention can provide predictive transmission according to the shape of the road and the optimum gear range through the predictive transmission control utilizing the GPS and the high density map so as to reduce unnecessary transmission and preemptively cope with dangers by previously recognizing the road situations.

Besides the above, the present invention has various effects, such as excellent applicability, and such effects will be clarified in the following detailed description of the preferred embodiment of the present invention.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
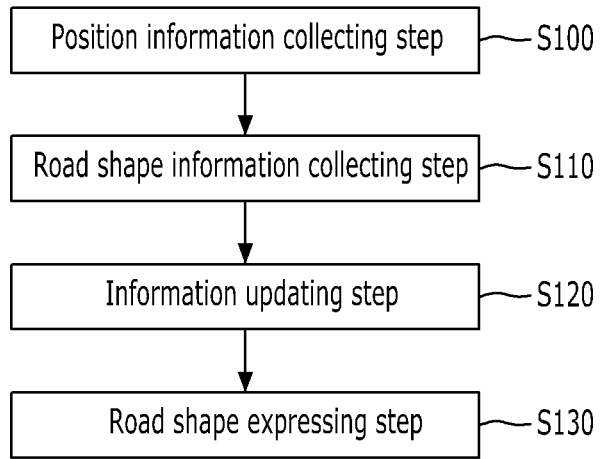
FIG. 1 illustrates a road shape recognition method for predictive transmission according to the present invention.

Hereinafter, the present disclosure will be described in more detail with reference to the exemplary embodiments.

In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

Moreover, it should be understood that a size or shape of the elements illustrated in the drawings may be exaggeratedly drawn to more clearly and conveniently explain the present invention. Furthermore, the terms specifically defined in consideration of the configuration and operation of the present invention are just to describe the embodiments of the present invention but do not limit the scope of the present invention.

FIG. 1 illustrates a road shape recognition method for predictive transmission according to the present invention.

According to a preferred embodiment of the present invention, the road shape recognition method for predictive transmission includes the steps of: (S100) collecting information of vehicle position; (S110) collecting information of road shapes necessary for the vehicle to recognize the road shape based on the vehicle position information; (S120) updating information of the road shape using the vehicle position information; and (S130) dividing a plurality of sections based on the front distance of the vehicle and expressing the level of the road shape in each section based on the road shape information.

Here, the vehicle position information may be collected through GPS information. The GPS information may be collected through a GPS receiver, a DR sensor unit and a GPS/DR filter.

The GPS receiver receives radio signals from a plurality of satellites, secures a distance from the satellites to the vehicle using running speed of the radio signals, and grasp information on vehicle position and time using the distance from the satellites to the vehicle.

The DR sensor unit can grasp information on running direction or speed of the vehicle. The DR sensor unit includes a sensor for measuring a running distance and a sensor for measuring a rotation angle. The sensor for measuring the running distance includes at least one of a speedometer, an odometer and an accelerometer. Moreover, the sensor for measuring the rotation angle includes at least one of an earth magnetism sensor and a gyro sensor. The DR sensor unit may be comprised of at least one of the sensor for measuring the running distance and the sensor for measuring the rotation angle or comprised of a combination of the sensors.

The GPS/DR filter can calculate the position and running direction of the vehicle based on data transferred from the GPS receiver and the DR sensor unit. The GPS/DR filter may be a Kalman filter according to embodiments.

The road shape information may be collected through a high density map data DB located inside or outside the vehicle.

The high density map data DB may be stored inside the vehicle, or may be stored outside the vehicle and transferred to the vehicle at a long range by wireless communication technology. According to embodiments, some of the high density map data DB is stored inside the vehicle and some of the high density map data DB is transferred to the vehicle at a long range by the wireless communication technology.

The navigation may serve as such a high density map data DB. The navigation can transfer the road shape information of the road on which the vehicle is running to a controller in real time. The road shape information may be transferred to the controller, for instance, by 10 meters, 50 meters or 100 meters ahead from the vehicle. In detail, road gradient information or curvature information of curve sections of the road at several meters ahead from the vehicle may be transferred.

In the road shape information collecting step (S110), the road shape information may be selected and collected based on the vehicle position information on the map data DB.

Because such road shape information is very large in capacity, the controller of the vehicle stores only information values within the range to influence on predictive transmission. That is, the controller receives and stores only necessary information, such as information related with point where transmission will start, information related with the gradient level of the road, information related with curvature of the road, and so on. Such functions save a memory space of the controller.

According to embodiments, the navigation can transfer the road shape information through a network of the vehicle, such as CAN network. According to embodiments, the controller of the vehicle can receive such information according to ADASIS communication protocol. The ADASIS protocol is especially useful at the time of transfer of high density map data of large capacity.

In order to recognize the shape of the front road, when the road shape information is collected, all of the shape information of the road in front of the vehicle cannot be collected, and for instance, the road shape information is collected at intervals of 10 meters, 100 meters, 200 meters and 400 meters ahead from the vehicle.

Because the vehicle continuously runs while the road shape information is collected, the road shape information collected corresponding to the running distance of the vehicle must be updated continuously. For instance, a transmission point is located at 100 meters in front of the vehicle, but if one second passes and the vehicle moves 30 meters, the information must be corrected in such a way that the transmission point is located at 70 meters ahead in consideration of the movement of the vehicle. Namely, the collected road shape information must be updated.

It is necessary to set the interval to collect the road shape information, and the predictive transmission can be controlled in such a way that the road shape informations collected at set intervals are respectively used at the set time intervals or at the set distances and are used at the set time intervals or distances again after being updated.

For instance, the predictive transmission can be controlled in such a way as to receive the road shape information by sections set by 10 meters, use the received road shape information for 20 seconds, receive the road shape information by sections set by 10 meters again and use the received road shape information for 20 seconds.

According to embodiments, in the road shape collecting step (S110) or the information updating step (S120), if there is any error in the vehicle position information or the road shape information, it may be corrected using the previously stored information.

Figure 2:
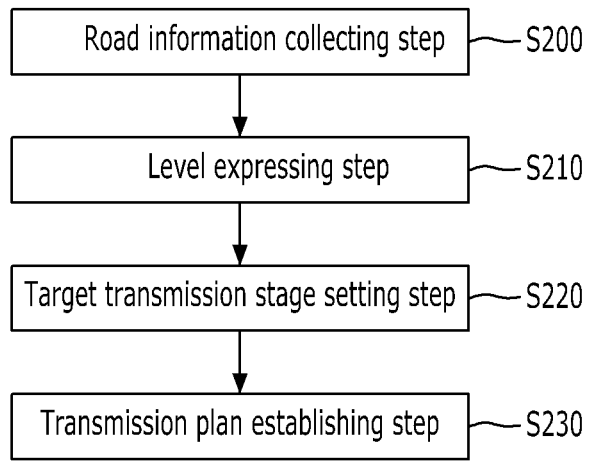
FIG. 2 illustrates a predictive transmission control method according to the present invention.

FIG. 2 illustrates a predictive transmission control method according to a preferred embodiment of the present invention.

The predictive transmission control method according to the preferred embodiment of the present invention includes the steps of: (S200) collecting road shape information of the road on which the vehicle is running; (S210) dividing a plurality of sections based on front distance of the vehicle and expressing the level of the road shape at the sections based on the road shape information; and (S220) setting a target gear of the predictive transmission based on the level of the road shape.

Here, the road shape contains gradient information of the road and curvature information of the road. Additionally, if the level of the road shape exceeds the previously set threshold value, the target gear of the predictive transmission can be set. If the level of the road shape is an object for predictive transmission control, a target gear of the predictive transmission can be set based on a road shape value and a front distance value corresponding to the level of the road shape.

The predictive transmission control method further includes a step of establishing a transmission plan of the predictive transmission based on the set target gear after the target gear setting step (S220), and the predictive transmission is controlled according to the transmission plan.

Figure 3:
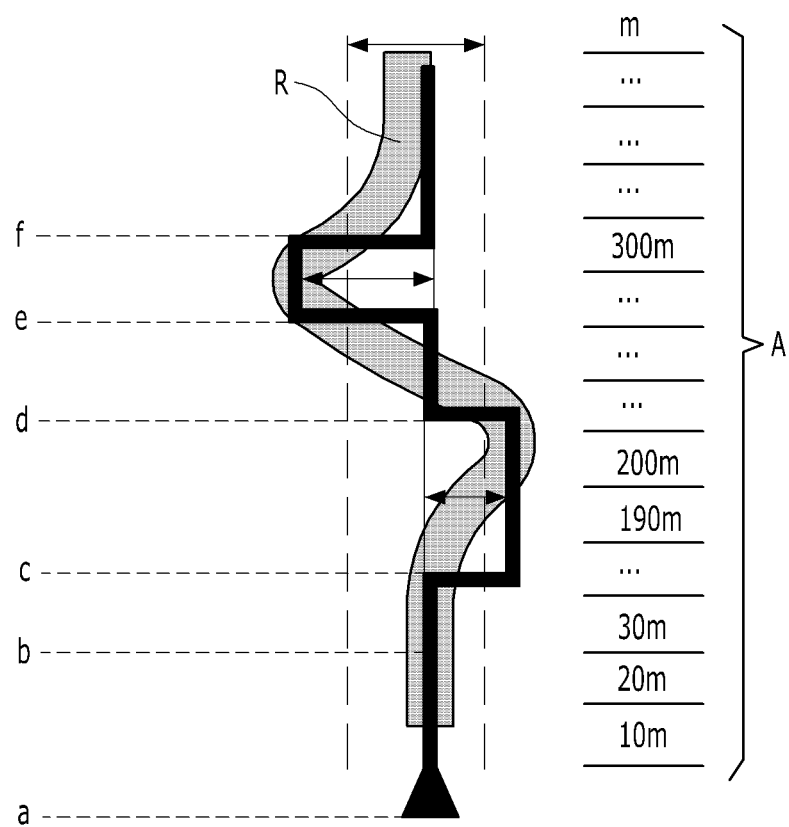
FIG. 3 illustrates a transmission point of the predictive transmission and the level of road shape according to the present invention.

FIG. 3 illustrates a transmission point of the predictive transmission and the level of road shape according to the present invention. In FIG. 3, a corner section of the road (R) ahead is divided into a right side and a left side, and a plurality of the sections at the right side are divided by 10 meters.

Moreover, in FIG. 3, the point a indicates the position of the vehicle, and points c to f indicate transmission points.

Referring to FIG. 3, the front distance from the vehicle is divided into several sections, for instance, by 10 meters or 50 meters, and the level of the road shape by sections is judged in relation with the shape of the road (R). Here, the level of the road shape may mean the degree of the gradient or curvature of the road (R) based on the road shape information, and the set level of each section of the road shape may be evaluated and expressed.

After the level by sections relative to the shape of the road (R) is set, a target gear is set in correspondence with the section (points c to f) having the gradient or curvature of more than the threshold value.

For instance, if the threshold value is set into three stages, a target gear is not set relative to the gradient or curvature (point b) which is in the level of the first or second step, and a target gear is set relative to the gradient or curvature (point c to f) of which the threshold value exceeds the third step. A target gear corresponding to the gradient or curvature corresponding to the level of the fourth step or the fifth step of which the gradient or curvature is severe is lower than that of the third step. Here, the target gear is set together with a transmission point transmitted to the target gear. That is, the transmission point at a point spaced apart from the present position point of the vehicle at a predetermined interval and a target gear corresponding to the transmission point are set.

For instance, the controller judges that a curvature with a value of 500 is located 150 meter in front of the vehicle based on a road shape value having the curvature information with a value of 500 and a front distance value of 150 meter, and sets the target gear of the predictive transmission based on the judgment.

When the level of the road shape is determined, the point (point c) where the corresponding gradient or curvature starts or the point (point b) before a predetermined distance from the start point of the corresponding gradient or curvature is set as the transmission point. A transmission plan for predictive transmission is established in combination of the transmission point (point b or c) starting the predictive transmission, a plurality of the target gears and the transmission point (points d to f) transmitted into the target gear, and the predictive transmission can be controlled by the transmission plan.

Figure 4:
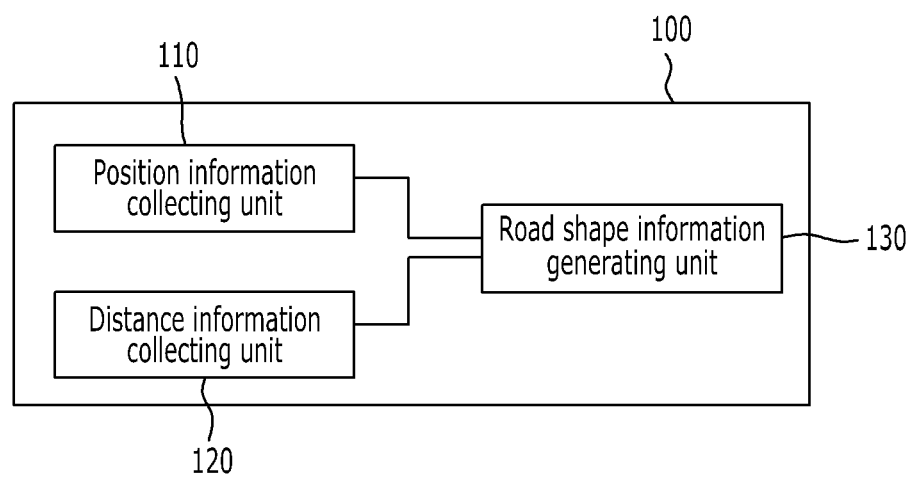
FIG. 4 illustrates a predictive transmission control device according to a preferred embodiment of the present invention.

FIG. 4 illustrates a predictive transmission control device according to a preferred embodiment of the present invention.

The predictive transmission control device according to the preferred embodiment of the present invention includes: a position information collecting unit 110 for collecting vehicle position information; a distance information collecting unit 120 for collecting front distance information of the vehicle; and a road shape information generating unit 130 which collects road shape information necessary for recognizing the shape of the front road (R) of the vehicle based on the vehicle position information, divides the road into a plurality of sections based on the front distance information, and expresses the level of the road shape relative to the sections based on the road shape information. Here, the road shape information generating unit 130 has the structure corresponding to the controller.

As described above, while the present invention has been particularly shown and described with reference to the example embodiments thereof, it will be understood by those of ordinary skill in the art that the above embodiments of the present invention are all exemplified and various changes, modifications and equivalents may be made therein without changing the essential characteristics and scope of the present invention.

Therefore, it would be understood that the embodiments disclosed in the present invention are not to limit the technical idea of the present invention but to describe the present invention, and the technical and protective scope of the present invention shall be defined by the illustrated embodiments.

It should be also understood that the protective scope of the present invention is interpreted by the following claims and all technical ideas within the equivalent scope belong to the technical scope of the present invention.

What is claimed is:

1. A road shape recognition method for predictive transmission comprising the steps of:
    collecting information of vehicle position;
    collecting information of a road shape necessary for the vehicle to recognize the road shape based on the vehicle position information;
    updating information of the road shape using the vehicle position information;
    dividing a road into a plurality of sections based on a front distance information;
    expressing a level of the road shape in each section relative to the plurality of sections based on the road shape information;
    setting a target gear of a predictive transmission based on the level of the road shape if the level of the road shape exceeds a previously-set threshold value;
    establishing a transmission plan of the predictive transmission based on the target gear, wherein the predictive transmission is controlled according to the transmission plan; and
    using the collected information and the transmission plan to shift the transmission,
    wherein in the road shape collecting step or the information updating step, if there is any error in the vehicle position information or the road shape information, the vehicle position information or the road shape information is corrected using previously stored information.

2. The road shape recognition method according to claim 1, wherein the vehicle position information is collected through GPS information.

3. The road shape recognition method according to claim 1, wherein the road shape contains gradient information of the road on which the vehicle is running and curvature information of the road.

4. The road shape recognition method according to claim 1, wherein the road shape information is collected through a high density map data located inside or outside the vehicle.

5. The road shape recognition method according to claim 1, wherein in the road shape information collecting step, the road shape information is selected and collected based on the vehicle position information on the map data.

6. A predictive transmission control method comprising the steps of:
    collecting road shape information of a road on which the vehicle is running;
    dividing a plurality of sections based on front distance of the vehicle and expressing a level of the road shape at the sections based on the road shape information; and
    setting a target gear of the predictive transmission based on the level of the road shape, if the level of the road shape exceeds a previously-set threshold value;
    establishing a transmission plan of the predictive transmission based on the target gear, wherein the predictive transmission is controlled according to the transmission plan; and
    using the collected information and the transmission plan to shift the transmission,
    wherein in the road shape information collecting step, if there is any error in the road shape information, the road shape information is corrected using previously stored information.

7. The predictive transmission control method according to claim 6, wherein the road shape contains gradient information of the road and curvature information of the road.

8. The predictive transmission control method according to claim 6, wherein if the level of the road shape is an object for predictive transmission control, the target gear of the predictive transmission is set based on the road shape information and a front distance value corresponding to the level of the road shape.

9. A predictive transmission control device comprising:
    a position information collecting circuitry configured to collect vehicle position information;
    a distance information collecting circuitry configured to collect front distance information of the vehicle; and
    a road shape information generating circuitry is configured to collect road shape information necessary for recognizing a shape of a front road of the vehicle based on the vehicle position information, divide the front road into a plurality of sections based on a front distance information, and express a level of the road shape relative to the plurality of sections based on the road shape information,
    wherein the road shape information generating circuitry is configured to set a target gear of a predictive transmission based on the level of the road shape if the level of the road shape exceeds a previously-set threshold value, establish a transmission plan of the predictive transmission based on the target gear, wherein the predictive transmission is controlled according to the transmission plan,
    wherein the vehicle position information or the road shape information is corrected using the previously stored information if there is an error in the vehicle position information or the road shape information,
    wherein the predictive control device uses the collected information and the transmission plan to shift the transmission.

* * * * *